Oct. 20, 1953

J. L. JOHNSON 2,656,517

RADIO FREQUENCY COUPLING APPARATUS

Filed Aug. 17, 1948

WITNESSES:
E. A. McCloskey
Wm. C. Groome

INVENTOR
John L. Johnson.
BY
F. E. Browder
ATTORNEY

Patented Oct. 20, 1953

2,656,517

UNITED STATES PATENT OFFICE 2,656,517

RADIO FREQUENCY COUPLING APPARATUS

John L. Johnson, Catonsville, Md., assignor to Westinghouse Electric Corporation, East Pittsburgh, Pa., a corporation of Pennsylvania Application August 17, 1948, Serial No. 44,611

8 Claims. (Cl. 333—73)

This invention relates to the transfer of radio frequency energy from one circuit to another, and has for an object the reduction of losses in such transfers of energy.

In certain types of radio frequency circuits, it is customary to couple one circuit to another through a coupling loop which is rotatable for varying the inductive coupling between the circuits. Connections to such loops have been completed through friction joints which have caused radio frequency losses.

A feature of this invention is that a rotatable, inductive coupling loop may be connected to its input or to its output circuit through capacity couplings, the capacity of which does not change with rotation of the loop.

Another feature of the invention is that the inductance of the coupling loop can be tuned out by one of its coupling capacitors at the working frequency.

Another object of the invention is to couple a rotatable, inductive coupling loop to a circuit through capacitors, the capacity of which does not vary during rotation of the loop.

Another object of the invention is to couple a rotatable, inductive coupling loop to a circuit through capacitors, the capacity of which is not changed during rotation of the loop, and to vary the capacity of one of the coupling capacitors independently of the rotation of the loop for tuning out the inductance of the loop at the working frequency.

The invention will now be described with reference to the drawing of which:

Figure 1:
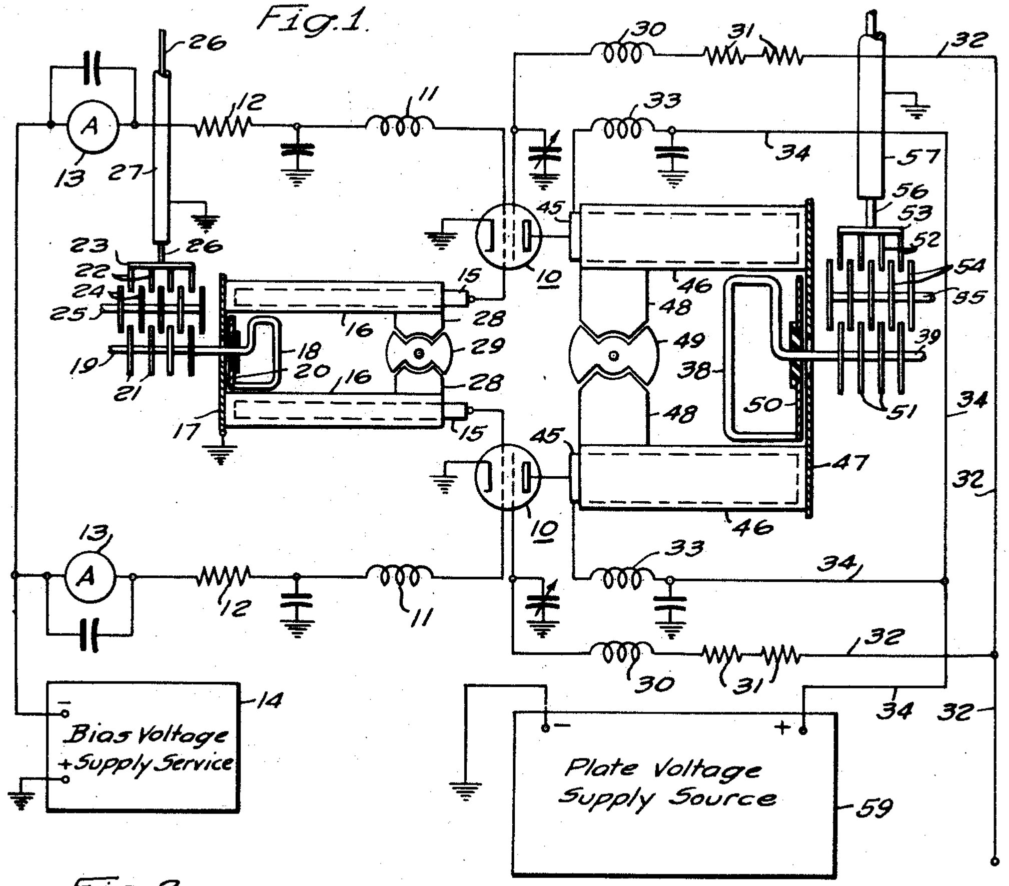
Fig. 1 is a circuit schematic of a radio frequency amplifier for a radio transmitter embodying this invention, side elevations of the coupling loops, the coupling capacitors therefor, and the input and output transmission lines being shown with portions in section.

The radio frequency amplifier tubes 10 have their control grids connected through the radio frequency chokes 11, the grid resistors 12, and the grid current meters 13 to the negative side of the bias-voltage supply source 14, the positive side of which is grounded. The control grids of the tubes 10 are also connected to the inner conductors 15 of coaxial lines, the outer conductors 16 of which terminate in the grounded shorting plate 17.

The coupling loop 18 extends between the outer coaxial line conductors 16 and is arranged to be rotated therebetween by its inner end which forms the rotary shaft 19 which extends through a clearance opening in the plate 17. The outer end of the loop 18 is connected at the inner side of the plate 17 to the circular, metal capacitor plate 20 which is insulatedly supported from the shaft 19 for rotation therewith. The shaft 19 on the outer side of the plate 17 has the spaced, circular, capacitor plates 21 attached thereto for rotation therewith.

The fixed, spaced, capacitor plates 22 are attached to the stator 23 and are aligned with corresponding plates 21. The butterfly capacitor plates 24 are attached to the rotary shaft 25 for rotation therewith, and mesh with the plates 21 and 22 when the shaft 25 is rotated.

The inner conductor 26 of the coaxial cable 27 is connected to the stator 23 and to an exciter, which is not illustrated.

The outer conductors 16 of the grid circuit coaxial lines have fixed capacitor plates 28 attached thereto, and butterfly rotor plates 29 mesh with the plates 28, and serve to tune the control grid circuit of the tubes 10 to resonance.

The screen grids of the tubes 10 are connected through the radio frequency chokes 30, the voltage dropping resistors 31, and the wiring 32 to a plus 2500 volt terminal of the rectifier of the transmitter with which the illustrated amplifier is used.

The plates of the tubes 10 are connected through the radio frequency chokes 33, and the wiring 34 to the plus 5,000 volt terminal of the plate voltage supply source 59, the negative terminal of which is grounded.

Figure 2:
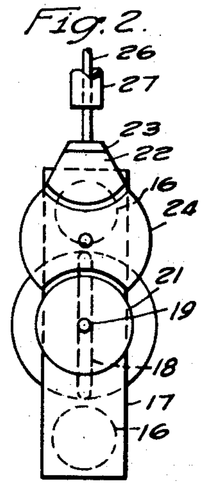
Fig. 2 is an enlarged end elevation with portions in dashed-line outline, of one of the coupling loops of Fig. 1, its input and output transmission lines, and its coupling capacitors.

Fig. 2 is an enlarged end elevation of the grid circuit coupling components numbered from 16 to 27, inclusive, and described in the foregoing. In the operation of these components, the loop 18 is rotated between the outer conductors 16 of the grid circuit coaxial lines until the coupling is adjusted to the correct value as indicated, for example, by space current readings, the loop being rotated by the rotation of its shaft 19. The capacitor plate 20 is rotated with the loop 18 and capacity couples the loop to the shorting plate 17 of the outer conductors 16 of the grid circuit coaxial lines. The capacitor plates 21 on the shaft 19 rotate therewith and capacity couple the loop 18 through the capacitor plates 24 and 22 to the conductor 26 from the exciter. Thus, as the loop 18 is rotated for coupling adjustment, those radio frequency losses which would result from the usual circuit completing friction joints are avoided. The capacity provided by the capacitor plates remains unchanged during the rotation of the loop so that only the inductive coupling is varied.

For tuning out the inductance of the loop 18 at the resonant frequency of the control grid circuit, the coupling capacity is varied by rotation of the butterfly capacitor plates 24 so that the capacity of the coupling between the capacitors 21 and 22 is varied. This adjustment by the butterfly capacitors is desirable where the grid circuit is to be operated at more than one frequency. Where the circuit is operated at but one frequency, the simpler, capacitor adjustment of Fig. 3 may be used.

Figure 3:
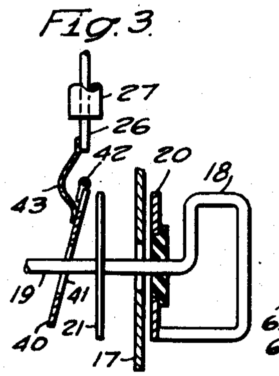
Fig. 3 is a side elevation with a portion in section of a coupling loop and a modification of a coupling capacity therefor, which may be used for tuning out its inductance where a single working frequency is used.

With reference to Fig. 3, the circular capacitor plate 40 has a central clearance opening 41 through which the rotary shaft 19 of the loop 18 extends. The plate 40 is pivoted at 42 so that its position relative to the one capacitor plate 21 may be varied, the plate 40 being connected by the flexible lead 43 to the exciter conductor 26. The plate 40 thus may be moved nearer the plate 21 for increasing the coupling capacity, or may be moved further away from the plate 21 for decreasing the coupling capacity.

The plates of the tubes 10 have a tank circuit which is coupled to an antenna in the same manner as the control grid circuit of the tubes 10 which has been described as coupled to an exciter, the difference being that an input circuit is coupled by a coupling loop and its associated coupling capacitors, to the described grid circuit, while an output circuit is coupled by a coupling loop and its associated coupling capacitors, to the tank circuit, as will be described.

The plates of the tubes 10 are connected to the inner conductors 45 of coaxial lines, the outer conductors 46 of which terminate in the grounded shorting plate 47. The coupling loop 38 extends between the outer conductors 46 of the tank circuit coaxial lines, and is arranged to be rotated therebetween by its inner end which forms the rotary shaft 39 which extends through a clearance opening in the plate 47. The outer end of the loop 38 is connected at the inner side of the plate 47 to the circular capacitor plate 50 which is insulatedly supported from the shaft 39 for rotation therewith. The shaft 39 on the outer side of the plate 47 has the spaced, circular capacitor plates 51 attached thereto for rotation therewith.

The fixed, spaced capacitor plates 52 are attached to the stator 53 and are aligned with corresponding plates 51. The butterfly, capacitor plates 54 are attached to the rotary shaft 55 for rotation therewith, and mesh with the plates 51 and 52 when the shaft 55 is rotated.

The inner conductor 56 of the coaxial cable 57 is connected to the stator 53 and to an antenna which is not illustrated.

The outer conductors 46 of the tank circuit coaxial lines have the fixed capacitor plates 48 attached thereto, and the butterfly rotor plates 49 mesh with the plates 48 and serve to tune the tank circuit to resonance.

An end elevation of the coupling components of the tank circuit would be similar to that illustrated by Fig. 2.

In operation, the loop 38 is rotated between the outer conductors 46 of the tank circuit coaxial lines until the coupling is adjusted to the correct value, the loop being rotated by rotation of its shaft 39. The capacitor plate 50 is rotated with the loop 38, and capacity couples the loop to the shorting plate 47 of the outer conductors 46 of the tank circuit coaxial lines. The capacitor plates 51 on the shaft 39 rotate therewith, and capacity couple the loop 38 through the capacitor plates 54 and 52 to the conductor 56 to the antenna. Thus, as the loop 38 is rotated for coupling adjustment, those radio frequency losses which would result from the current completing friction joints previously used are avoided. The capacity provided by the coupling capacitor plates remains unchanged during the rotation of the loop so that only the inductive coupling is varied.

For tuning out the inductance of the loop 38 at the resonant frequency of the tank circuit, the coupling capacity is varied by rotation of the butterfly capacity plates 54. This adjustment by the butterfly capacitors is desirable when the tank circuit is to be operated at more than one frequency. Where the tank circuit is to be operated at but one frequency, the simpler, capacitor adjustment of Fig. 3 may be used as described in the foregoing in connection with the tuning out of the inductance of the loop 18.

Figure 4:
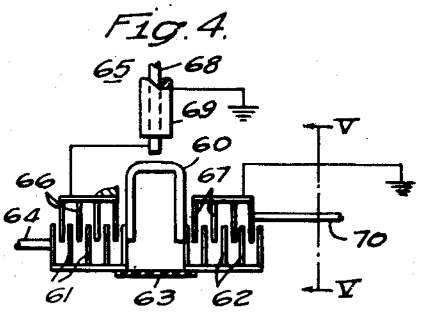
Fig. 4 is a side elevation of a coupling loop and a second modification of a coupling capacity therefor.
Figure 5:
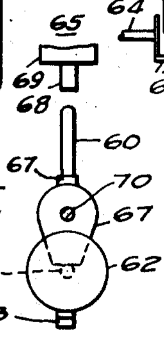
Fig. 5 is an enlarged end view of the arrangement shown in Fig. 4, looking in the direction of line V—V.

With reference to Figs. 4 and 5, a loop 60 is electrically connected to two sets of circular condenser plates 61 and 62. These two sets of plates are mechanically connected together by an insulating bar 63. A shaft 64 is connected to the center of the end plate of the set 61 for rotating the loop to inductively couple it to another loop circuit, not shown. The loop 60 is coupled to a coaxial transmission line 65 by means of a fixed set of condenser plates 66 and an adjustable set of condenser plates 67. The fixed plates 66 are connected to the center conductor 68 of the line 65 and the adjustable plates 67 are connected to the outer conductor 69 through ground. The plates 67 are of irregular or non-circular shape, as seen from Fig. 5, and a shaft 70 is connected to the end plate of the set for rotating them to adjust the capacitive coupling of the loop 60 to the line 65. From this it is realized that due to the circular shape of the plates 61 and 62 the capacitive coupling of the loop 60 and the line 65 remains unchanged during rotation of the loop 60, and only the inductive coupling is changed. However, the capacitive coupling may be varied or adjusted by rotating the noncircular plates 67 into or out of the space between the respective circular plates 62.

From the foregoing description, it should be apparent that a rotatable, inductive coupling loop may have an input circuit or an output circuit completed thereto through capacity couplings, the capacity of which is not affected by rotation of the loop, and the use of which avoids the radio frequency losses which resulted from the prior circuit completing friction joints.

I claim as my invention:

1. Radio frequency apparatus comprising a first pair of conductors, a second pair of conductors, a loop rotatable between the conductors of said first pair of conductors, said loop being rotatable about an axis which extends in a direction substantially parallel to the general direction of said first pair of conductors, and means including a capacitor plate connected to said loop and rotatable therewith, and a second capacitor plate connected to one of the conductors of the second pair of conductors for capacity coupling said loop thereto.

2. Radio frequency apparatus, as claimed in claim 1, in which means is provided for varying the spacing between said plates for tuning out the effect of the inductance of said loop.

3. Radio frequency apparatus comprising a first pair of conductors; a second pair of conductors; a loop rotatable between one pair of said conductors; said loop being rotatable about an axis which extends in a direction substantially parallel to the general direction of said one pair of conductors; a first capacitor plate connected to said loop and rotatable therewith; a second rotatable capacitor plate extending alongside said plate; and a third capacitor plate extending alongside said second plate and connected to one of the conductors of said other pair of conductors, said first capacitor plate being circular whereby its rotation can cause no capacity change, said second plate having an irregular shape whereby it can be rotated to tune out the effect of the inductance of said loop.

4. Radio frequency apparatus comprising a first pair of conductors; a second pair of conductors; a loop rotatable between said second pair of conductors, said loop being rotatable about an axis which extends in a direction substantially parallel to the general direction of said second pair of conductors said loop having one end contacting a first capacitor plate, and having its other end extending as a rotary shaft through an opening in the plate; means insulatedly supporting said plate from said shaft for rotation therewith; a second capacitor plate extending alongside said plate and connected to said second pair of conductors, said second plate having a clearance opening through which said shaft extends; and means capacity coupling said shaft to the first pair of said conductors.

5. Radio frequency apparatus comprising a first pair of conductors; a second pair of conductors; a loop rotatable between said second pair of conductors, said loop being rotatable about an axis which extends in a direction substantially parallel to the general direction of said second pair of conductors said loop having one end contacting a first capacitor plate, and having its other end extending as a rotary shaft through an opening in the plate; means insulatedly supporting said plate from said shaft for rotation therewith; a second capacitor plate extending alongside said plate and connected to said second pair of conductors, said second plate having a clearance opening through which said shaft extends; a third capacitor plate extending alongside said second plate on the opposite side thereof from said first plate and attached to said shaft for rotation therewith; and means including a fourth capacitor plate connected to one of said first pair of conductors and including said third plate for capacity coupling said loop to said first pair of conductors.

6. Radio frequency apparatus, as claimed in claim 5, in which means is provided for varying the capacity between said third and fourth plates for tuning out the effect of the inductance of said loop.

7. Radio frequency apparatus comprising a first pair of conductors; a second pair of conductors; a loop rotatable between one pair of said conductors; said loop being rotatable about an axis which extends in a direction substantially parallel to the general direction of said one pair of conductors; means including a first capacitor plate rotatable with said loop and connected to one end thereof, and including a second capacitor plate connected to said one pair of conductors for capacity coupling said loop to said one pair of conductors; and means including a third capacitor plate for varying the capacity of said last-mentioned capacity coupling for tuning out the effect of the inductance of said loop.

8. Radio frequency apparatus comprising a first pair of conductors; a second pair of conductors; a loop rotatable between said second pair of conductors, said loop being rotatable about an axis which extends in a direction substantially parallel to the general direction of said second pair of conductors, said loop having one end contacting a first capacitor plate, and having its other end extending as a rotary shaft through an opening in the plate; means insulatedly supporting said plate from said shaft for rotation therewith; a second capacitor plate extending alongside said plate and connected to one of said first pair of conductors, said second plate having a clearance opening through which said shaft extends; a third capacitor plate extending alongside said second plate on the opposite side thereof from said first plate and attached to said shaft for rotation therewith; a fourth rotatable capacitor plate extending alongside said third plate; and a fifth capacitor plate extending alongside said fourth plate and connected to one of said first pair of conductors, said third plate being circular, and said fourth plate having an irregular shape whereby it can be rotated to tune out the effect of the inductance of said loop.

JOHN L. JOHNSON.

References Cited in the file of this patent

UNITED STATES PATENTS

| Number | Name | Date |
|---|---|---|
| 1,768,703 | Marvel | July 1, 1930 |
| 2,194,696 | Eickemeyer | Mar. 26, 1940 |
| 2,227,487 | Chaffee | Jan. 7, 1941 |
| 2,342,628 | Evjen | Feb. 29, 1944 |
| 2,542,416 | Kach | Feb. 20, 1951 |